3,829,406
FABRICABLE INFUSIBLE PARA-OXYBENZOYL POLYESTER PRODUCTION
Steve G. Cottis, Amherst, James Economy, Eggertsville, and Bernard E. Nowak, Lancaster, N.Y., assignors to The Carborundum Company, Niagara Falls, N.Y.
Filed Oct. 1, 1971, Ser. No. 185,623
Int. Cl. C08g 17/02
U.S. Cl. 260—47 C                    10 Claims

ABSTRACT OF THE DISCLOSURE

Polyesters are produced which consist essentially of recurring p-oxybenzoyl structural units and which are infusible and very thermally stable, but which are fabricable by virtue of a reversible crystalline transition which occurs in the temperature range from about 330° C. to about 360° C. Such polyesters are produced by heating p-acetoxybenzoic acid in an inert, high boiling liquid heat transfer medium to a temperature above 300° C. but below about 425° C., and maintaining the temperature in the specified range until sufficient condensation has occurred to produce the desired polyester. In addition to being infusible, thermally stable and fabricable, the polyesters are characterized by excellent chemical, mechanical, electrical and thermal properties.

---

The present invention relates to the preparation of paraoxybenzoyl polyesters, i.e., polyesters consisting essentially of recurring p-oxybenzoyl structural units linked together to form polymer chains. The p-oxybenzoyl polyesters to which the invention relates exhibit excellent thermal stability and are infusible, but are nonetheless fabricable by various techniques by virtue of a reversible crystalline transition which the polyester undergoes in the temperature range from about 330° C. to about 360° C.

In recent years, considerable effort has been expended in an attempt to develop highly thermally stable polymers which are able to withstand relatively high temperatures without decomposition and/or impairment of their mechanical and other properties. In addition to possessing good mechanical, chemical, electrical and thermal properties and good retention of those properties at relatively high temperatures, it is also highly desirable that such thermally stable polymers be infusible. It is, of course, also important that the polymers be capable of fabrication into desired forms. However, it has been a major problem in the attempt to develop useful high temperature polymers that the goals of high temperature resistance and infusibility are generally contrary to the goal of fabricability.

One class of polymers that has received considerable attention are the oxybenzoyl polyesters. However, considerable difficulty has been encountered in producing oxybenzoyl polyesters, especially p-oxybenzoyl polyesters, and particularly in producing such polyesters which are infusible but nonetheless fabricable.

An early attempt was made to produce p-oxybenzoyl polyesters by heating p-hydroxybenzoic acid alone, but at most slight polymerization occurred, although a somewhat greater degree of polymerization has been achieved in the presence of certain condensation agents. Low molecular weight p-oxybenzoyl polyesters containing only a few structural units in the polyester chain have been prepared by employing p-hydroxybenzoyl chloride instead of the free acid as a monomer. It has generally been found that higher molecular weights are more readily attainable in m-oxybenzoyl polyesters and in p-oxybenzoyl polyesters containing m-oxybenzoyl or o-oxybenzoyl structural units in the chains, but such polyesters are generally too low melting to be of interest for high temperature applications.

U.S. Pat. 2,600,376 discloses a method for the preparation of polyesters which comprises condensing one or more m- or p-hydroxybenzoic acids, including nuclearly substituted derivatives thereof, by heating them in the presence of a lower alkanoic acid anhydride and a catalyst, but the products soften at 180–260° C. and they therefore are not suitable for many high temperature applications. U.S. Pat. 2,728,747 teaches the preparation of polyester resins by heating p-hydroxybenzoic acid or p-acetoxybenzoic acid in a solvent in the presence of triphenyl phosphite as a condensing agent, but the products are fusible, melting at relatively low temperatures of 150–350° C. Similarly, U.S. Pat. 3,039,994 discloses the polymerization of a hydroxybenzoic acid or an alkyl ester of an acetoxybenzoic acid by heating it in a solvent such as a tertiary amine which also acts as a polymerization catalyst, but again, the products are fusible, although their melting points are somewhat higher, being in excess of 400° C.

Gilkey et al., "Polyesters of Hydroxybenzoic Acids," Journal of Applied Polymer Science, Vol. II, Issue 5, pages 198–202 (1959), report melt phase polymerization of acetoxybenzoic acids, preferably in the presence of a catalyst such as magnesium and preferably at a reduced pressure. However, p-oxybenzoyl polyesters produced in accordance with the teachings of this article have been found not to be fabricable by such conventional methods as compression molding. Although they resemble the p-oxybenzoyl polyesters of the present invention in that they neither melt nor exhibit a glass transition upon heating, they are markedly different and inferior, both in respect of thermal stability and in that they do not display the reversible crystalline transition which characterizes the polyesters of the present invention and permits them to be readily fabricated. Instead, the p-oxybenzoyl polyesters of Gilkey et al. undergo decomposition and an irreversible loss of crystallinity when heated to temperatures of about 350° C. or more.

So far as is known, the most successful approach to date to the preparation of infusible but fabricable p-oxybenzoyl polyesters is described in British patent specification 1,173,121. According to that specification, oxybenzoyl polyesters are produced by condensation of a phenyl or alkyl ester of a hydroxybenzoic acid or hydroxyl-substituted derivative thereof. However, the necessity of preparing these esters as starting monomers for the condensation adds considerably to the length of the process and the expense of the products.

In accordance with the present invention, there is provided an improved, rapid and economical process for the preparation of p-oxybenzoyl polyesters which are characterized by outstanding thermal stability, excellent chemical, mechanical, electrical and thermal properties and retention of these properties at relatively high temperatures, and which, while infusible, are nonetheless easily fabricable into various shapes and forms. The polyesters produced according to the method of the invention consist essentially of recurring p-oxybenzoyl structural units linked together to form polyester chains, and while they neither melt nor undergo a glass transition, they undergo a crystalline transition upon heating them to a temperature of from about 330° C. to about 360° C. This crystalline transition is reversible, the polyesters resuming their original state upon cooling. Upon undergoing the crystalline transition, the polyesters become capable of flowing under pressure, and accordingly, such polyesters may readily be fabricated by such techniques as compression molding, impact molding, and plasma spraying at temperatures of about 330–360° C. or above. Since the crystalline transition only occurs at these relatively high temperatures, however, articles fabricated from such polyesters are capable of retaining their dimensional integrity up to such temperatures in load-bearing applications and at even higher temperatures in other applications.

Briefly, the process of the invention comprises heating p-acetoxybenzoic acid, a relatively inexpensive monomer, in an inert, high boiling liquid heat transfer medium to a temperature above 300° C. but below about 425° C., preferably at least about 340° C. Condensation occurs rapidly in the specified temperature range and heating is continued at a temperature within this range for a time sufficient to result in sufficient condensation to produce the desired p-oxybenzoyl polyester.

The invention will now be further described partly with reference to the following example, which is intended to illustrate and not to limit the scope of the invention.

EXAMPLE 250 g. of a mixture consisting of 40% o-terphenyl and 60% m-terphenyl is charged into a four-necked, round bottom flask fitted with a stirrer, a nitrogen inlet, a thermometer and a distilling head leading to a condenser. The distilling head is externally wound with electrical resistance heating wire in order that it may be heated and a heating mantle is provided to heat the flask and its contents. The contents of the flask are melted by heating to about 60° C., whereupon 68 g. of p-acetoxybenzoic acid are added with stirring. The entire condensation is carried out with constant stirring and with a slow flow of nitrogen through the flask to provide a non-oxidizing atmosphere. The distilling head is heated to about 120° C. and the mixture in the flask is heated to about 340° C., polyester precipitation starting to occur at about 300° C. The distilling head temperature is then raised to about 180° C. to avoid refluxing of the distillate and/or solidification thereof in the distilling head, and the mixture in the flask is held at about 340° C. for about 12 hours. A total of 26.5 g. of distillate is collected, consisting primarily of acetic acid, the remainder being primarily terphenyl liquid heat transfer medum. It is observed that 25 g. of this distillate are collected within 35 minutes after the temperature of 340° C. has been reached, indicating that the polymerization is already approaching completion within this time.

The resulting mixture is cooled to 80° C., becoming quite viscous. About 200 ml. of acetone are added slowly and the mixture is filtered to recover the polyester precipitate. The polyester is extracted overnight with acetone in a Soxhlet extractor to remove any residual terphenyl liquid heat transfer medium and is then dried in vacuum for 3 hours at 110° C. A yield of 43 g. (96% of theory) of p-oxybenzoyl polyester powder is obtained.

The product was infusible and upon being held at 400° C. in air it exhibited a weight loss of only 0.83% per hour. Differential thermal analysis revealed an endotherm, during heating, at 329–343° C., with a peak at 336° C. and a corresponding exotherm during cooling, evidencing a reversible crystalline transition. This reversible transition was also evidenced by a marked change which occurred in the X-ray powder diffraction pattern upon heating the product to about 340° C., the original pattern being resumed upon cooling.

The sole figure of the accompanying drawing is a photograph of the X-ray powder diffraction pattern of the product at room temperature, using monochromatic copper K-alpha radiation, the large number and the sharpness of the diffraction lines indicating that the polyester is highly crystalline.

Upon compression molding the polyester powder produced in the example for 2 minutes at 435° C. at a pressure of 15,000 p.s.i. (1050 kg./sq. cm.), a sound piece was obtained having a flexural strength of 7030 p.s.i. (490 kg./sq. cm.) and a flexural modulus of $0.67 \times 10^6$ p.s.i. ($0.047 \times 10^6$ kg./sq. cm.).

The use of a liquid heat transfer medium is essential to the method of the invention. The liquid must be inert, i.e., it must be non-reactive with the p-acetoxybenzoic acid monomer and the condensation products thereof under the conditions employed. The liquid must also be high boiling, having a boiling point under the conditions employed which is at least as high as the highest temperature to which the reaction mixture is heated, and conveniently somewhat higher so that refluxing may be avoided. It will be apparent that the heat transfer medium need not be liquid at room temperature, but it should preferably have a melting point below that of the monomer (about 180° C.). A wide variety of materials has been found to be suitable as liquid heat transfer media including, for example, o-terphenyl, m-terphenyl, p-terphenyl and mixtures of two or more thereof such as employed in the example; partially hydrogenated terphenyls such as those commercially available under the trade mark Therminol® 66; and a eutectic mixture of 73.5% diphenyl oxide and 26.5% diphenyl such as that which is commercially available as Dowtherm® A heat transfer medium. Also suitable are chlorinated diphenyls such as those commercially available under the trademarks Aroclor® and Therminol® FR, as well as chlorinated terphenyls and higher polyphenyls. Other suitable liquid heat transfer media include diphenoxybiphenyls and mixtures thereof such as those disclosed in U.S. Pat. 3,406,207.

Most conveniently, the p-acetoxybenzoic acid monomer and the heat transfer medium are simply mixed at room temperature (about 25° C.) and the mixture is heated to the desired final temperature within the specified range. It appears that the superior results obtained by the method of the invention are due at least in part to the relatively high final temperature, at which condensation occurs rapidly to produce a highly thermally stable product. The desired polymerization occurs sufficiently rapidly at temperatures slightly above 300° C. and even more rapidly at about 340° C. and higher, but temperatures of about 425° C. or higher must be avoided because thermal decomposition of the resulting polyester becomes undesirably rapid at such high temperatures.

The mixture is held at the final temperature until condensation is substantially complete, and the higher the temperature the shorter the time required, the condensation being substantially complete within less than 1 hour at 340° C. in the example. However, the mixture is preferably held at the final temperature for at least about 3 hours, and still more preferably, for about 6–12 hours, to reduce the likelihood of lower molecular weight molecules being present in the product. No advantage has been found in holding the mixture at the final temperature for more than about 12 hours. The resulting polyester may be recovered by conventional techniques.

The condensation is most conveniently carried out at atmospheric pressure as in the example, although subatmospheric or superatmospheric pressures may be employed, if desired. It is preferred to carry out the condensation in a non-oxidizing atmosphere as in the example to eliminate the possibility of oxidative decomposition of the intermediate condensation products. Nitrogen, carbon dioxide, inert gases such as argon, and the like are quite satisfactory. It will be noted that the method is particularly advantageous in that it does not require the presence of a catalyst or condensation agent, which might otherwise contaminate the product or be required to be removed therefrom.

The p-oxybenzoyl polyesters of the invention possess excellent thermal stability, exhibiting a weight loss of less than 1% per hour upon isothermal gravimetric analysis at 400° C. in air. Being infusible, they have no melting point, decomposing without melting if heated to a sufficiently high temperature. They are highly crystalline, which may account in part for their excellent thermal stability.

The reversible crystalline transition which these polyesters undergo upon heating is evidenced by X-ray powder diffractometry. Upon heating, a pronounced change in the X-ray diffraction pattern is observed in the temperature range from about 330° C. to about 360° C., this changed X-ray diffraction pattern continuing to be exhibited at temperatures above 360° C. The precise nature of the transition has not been determined, but the polyesters retain some crystallinity at temperatures above 360° C., and it appears that during the crystalline transition the material undergoes a one-dimensional loss of crystallinity between the crystal planes. On cooling, the polyester resumes the original X-ray pattern, showing that there is no appreciable thermal degradation or permanent loss of crystallinity during the transition, which therefore is reversible.

The crystalline transition is also discernible by thermomechanical analysis, a method of measuring linear expansion resulting from increases in temperature. Marked expansion is observed to begin at a temperature of about 330° C. and end at about 360° C. This expansion is also reversible, the material contracting upon cooling.

The p-oxybenzoyl polyesters of the invention are insoluble in virtually all organic solvents and are resistant to non-oxidizing acids and dilute alkalies. Parts fabricated from the polyesters have good wear resistance, thus the polyesters are useful for such articles as bearings, valve seats, pump parts, wear discs and the like. The polyesters have a very high thermal conductivity, thus being useful in applications where friction is a factor, being able to rapidly dissipate the heat generated by the friction. The polyesters also have a high dielectric strength, rendering them useful for such applications as electrical insulation and printed circuit substrates.

Percents referred to herein are by weight unless otherwise stated or clearly indicated by the context.

While the invention has been described herein with reference to certain examples and preferred embodiments, it is to be understood that various changes and modifications may be made by those skilled in the art without departing from the concept of the invention, the scope of which is to be determined by reference to the following claims.

We claim:

1. A process for the preparation of an infusible thermally stable, para-oxybenzoyl polyester which has a weight loss of less than 1% per hour by isothermal gravimetric analysis at 400° C. in air and exhibits a reversible crystalline transition at a temperature in the range of from about 330° C. to about 360° C., comprising heating para-acetoxybenzoic acid to a temperature above 300° C. and below about 425° C. in a high boiling liquid heat transfer medium having a boiling point greater than the temperature to which the para-acetoxybenzoic acid is heated, being inert to the reaction conditions, the para-acetoxybenzoic acid and the condensation products and polyester produced and being a nonsolvent for the polyester, and continuing heating and maintenance of a temperature in the mentioned range for a time sufficient to produce said insoluble polyester.

2. A process according to claim 1 wherein the reaction temperature is at least 340° C.

3. A process according to claim 1 wherein the liquid heat transfer medium is selected from the group consisting of ortho-terphenyl; meta-terphenyl; para-terphenyl; mixtures of two or more of such terphenyls; partially hydrogenated terphenyls; a eutectic mixture of diphenyl oxide and diphenyl; chlorinated diphenyls; chlorinated terphenyls; higher polyphenyls; diphenoxybiphenyls; and mixtures thereof.

4. A process according to claim 2 wherein the liquid heat transfer medium is selected from the group consisting of ortho-terphenyl; meta-terphenyl; para-terphenyl; mixtures of two or more of such tephenyls; partially hydrogenated terphenyls; a eutectic mixture of diphenyl oxide and diphenyl; chlorinated diphenyls; chlorinated terphenyls; higher polyphenyls; diphenoxybiphenyls; and mixtures thereof.

5. A process according to claim 4 wherein the liquid heat transfer medium has a melting point below 180° C. and the condensation-polymerization reaction is effected with stirring of the reaction mix under a non-oxidizing atmosphere at atmospheric pressure.

6. A method according to claim 5 wherein during the condensation-polymerization reaction a distillate which primarily comprises acetic acid is removed from the reaction mixture.

7. A method according to claim 6 wherein the condensation-polymerization reaction is effected at a temperature of 340° C. to 425° C. over a period of at least about three hours in the absence of catalyst.

8. A method according to claim 1 wherein the condensation-polymerization reaction is effected at a temperature of 300 to 425° C. for at least three hours in the absence of a catalyst for the reaction.

9. A method according to claim 6 wherein the condensation-polymerization reaction is carried out for from six to twelve hours in the absence of a catalyst for the reaction.

10. A method according to claim 9 wherein the heat transfer medium is a solid at room temperature and is liquid at the reaction temperature and below 180° C. and comprises about 40% of ortho-terphenyl and 60% of meta-terphenyl, the proportion of liquid heat transfer medium to acetoxybenzoic acid is about 125:34, nitrogen is flowed through the reaction medium to provide a non-oxidizing atmosphere, the reaction is carried out at a temperature of about 340° C. for about 12 hours and the reaction mixture is cooled to about 80° C. and is extracted with about 100 parts of acetone, after which the acetone and residual terphenyl liquid heat transfer medium are removed by drying under vacuum for about three hours at about 110° C., yelding about 96% of the theoretical quantity of para-oxybenzoyl polyester in powder form, which powder is infusible, undergoes an endothermic crystalline transition during heating, with a peak at about 336° C., and a corresponding exothermic transition during cooling, exhibits a weight loss of about 0.8% per hour at 400° C. in air and, upon compression molding for two minutes, at 435° C. and a pressure of about 15,000 lbs./sq. in., results in a product having a flexural strength of about 7,000 lbs./sq. in and a flexural modulus of about 700,000 lbs./sq. in.

References Cited
UNITED STATES PATENTS

| | | | |
|---|---|---|---|
| 3,549,593 | 12/1970 | Takekoshi | 260—47 |
| 3,662,052 | 5/1972 | Nowak et al. | 264—119 |
| 3,668,300 | 6/1972 | Nowak et al. | 174—68.5 |
| 2,728,747 | 12/1955 | Aelony et al. | 260—78.3 |
| 3,039,994 | 6/1962 | Gleim | 260—47 |

LESTER L. LEE, Primary Examiner

U.S. Cl. X.R.

264—126, 320